Dec. 25, 1962 L. D. SOUBIER 3,069,879
APPARATUS FOR PRODUCING CHARGES OF MOLTEN GLASS
Filed Oct. 11, 1957 2 Sheets-Sheet 1

INVENTOR.
Leonard D. Soubier
BY J. R. Nelson &
W. A. Sekaich
ATTORNEYS

Dec. 25, 1962    L. D. SOUBIER    3,069,879
APPARATUS FOR PRODUCING CHARGES OF MOLTEN GLASS
Filed Oct. 11, 1957    2 Sheets-Sheet 2

INVENTOR.
Leonard D. Soubier
BY J. R. Nelson +
W. A. Schaich
ATTORNEYS

3,069,879
Patented Dec. 25, 1962

3,069,879
APPARATUS FOR PRODUCING CHARGES OF
MOLTEN GLASS
Leonard D. Soubier, Toledo, Ohio, assignor to Owens-
Illinois Glass Company, a corporation of Ohio
Filed Oct. 11, 1957, Ser. No. 689,680
3 Claims. (Cl. 65—327)

This invention relates to a new and novel apparatus for segregating charges or gobs of molten glass from a main supply body thereof.

In particular, this includes an apparatus having utility wherein such charges may be separated from the main body of glass at speeds of the order of one hundred per minute upwards and accomplishes this without deflecting the charges out of their alignment with the vertical axis of their point of formation or origination.

In present day gob feeding devices there is a definite lack of means to vary or regulate the rate of continuous flow of glass through an orifice and as a result, the possible speed of productivity for any given set of conditions is limited thereby.

In this present invention there is a definite relationship between the glass temperature, pressure head, orifice dimensions and the rate at which charges will issue through a single or several orificial openings. Inasmuch as the operation of such a system will normally occur with temperatures of the glass in excess of that now normally utilized in such devices, it therefore becomes expedient that the pressure head be controlled with considerable accuracy. This may be acomplished by adjustment of sleeve or other types of members which provide control of the depth of glass over the orifiical openings.

This invention has for its main object, the supplying of a body of molten glass over either a single or a plurality of orificial openings, controlling the static pressure head over said openings in accordance with the size and volume of glass to be segregated into charges, and then severing the charges as plural charges and in succession from the main supply body at a point at or within the orificial openings and the supply body.

It is a further object of this present invention to provide a device which will permit the acceleration or deceleration, at will, of the rate of severance of charges of molten glass during their flow through said orificial openings.

A still further object is the extrusion of the glass through orificial openings under pressure and the successive severing of charges of molten glass therefrom without any detrimental physical contact therewith at the severing.

Other and various objects and advantages will be readily apparent from the accompanying description and the drawings, on which:

Figures 1, 2, 4:
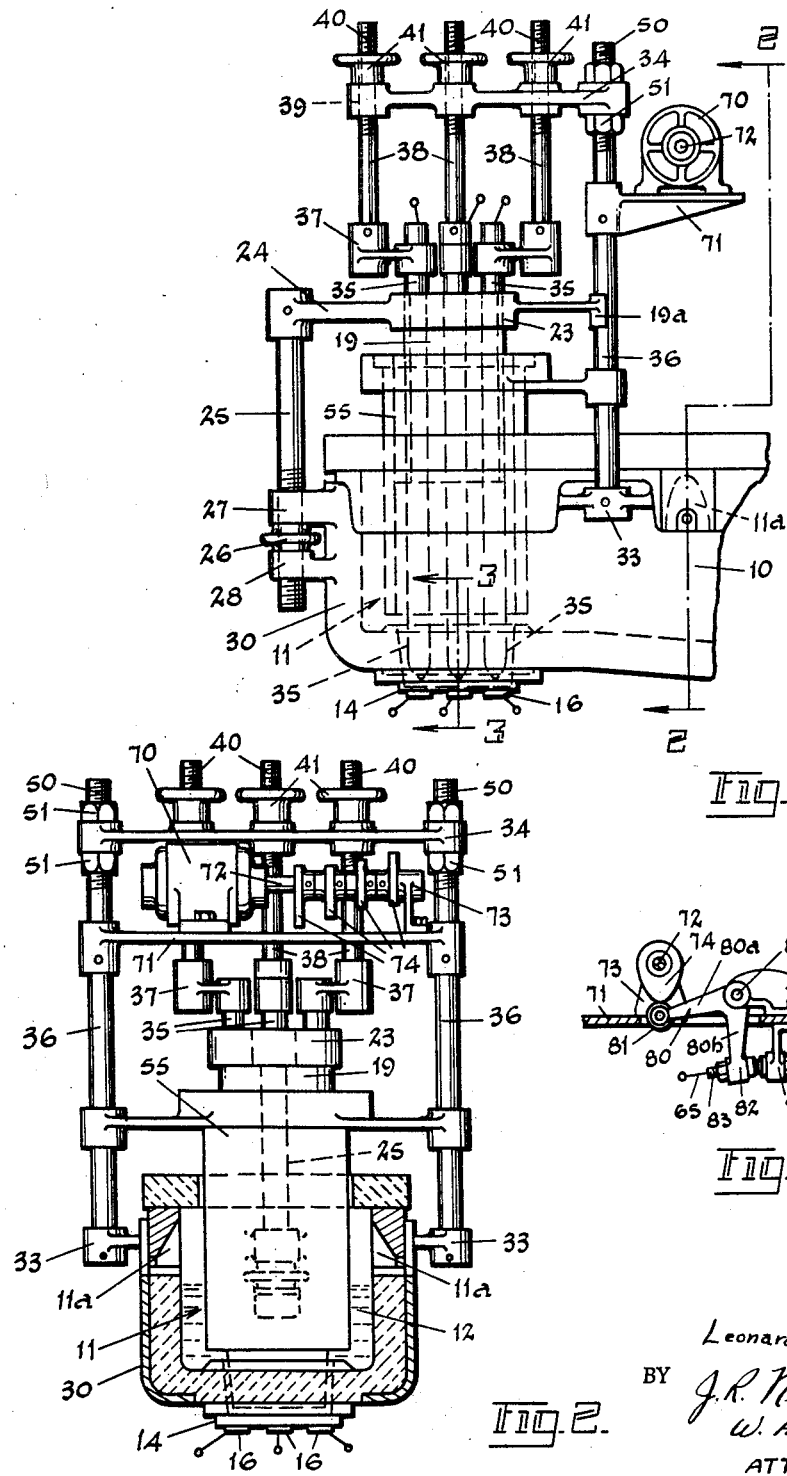
FIG. 1 is a side elevational view of a feeding forehearth.
FIG. 2 is a partial sectional elevational view of the nose of the feeder forehearth, taken along line 2—2 of FIG. 1, showing the means for timing and adjusting the severing devices and supporting the pressure control member.
FIG. 4 is a view of the timing mechanism for severing gobs.

Having reference to the accompanying drawings in FIGS. 1 and 2, a forehearth is shown as having a channel 10 and a glass delivery section 11 at the outer end of the channel 10. The forehearth, including the delivery section, is heated by the usual sidewall burners 11a positioned along the sides thereof. These sections may be constructed in any well-known manner and from various well-known materials adapted for such purpose. The section 10 is a longitudinally extending channel formation which is in open communication at its inner end with the interior of the refiner section of a glass melting tank (not shown) and also in open communication at its opposite or outer end with the glass delivery section 11 of the forehearth.

Figure 3:
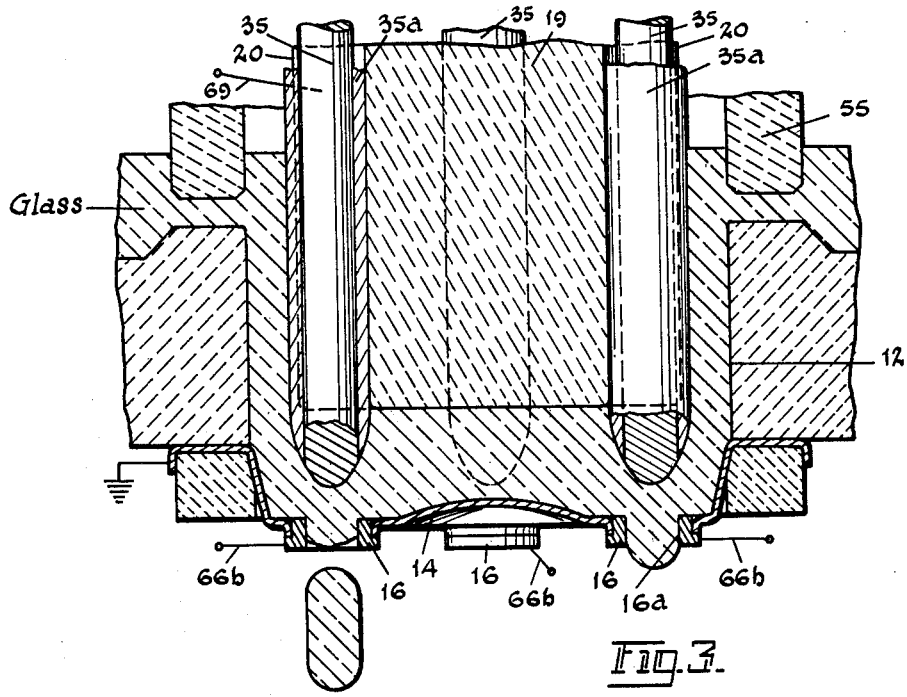
FIG. 3 is an enlarged, sectional elevational view, taken along line 3—3 of FIG. 1, showing one form of the severing and orifice members.

As shown on FIG. 3, the glass delivery section 11 has a well 12 formed in its bottom portion, said well being located on the longitudinal centerline of the forehearth. If more than one well is used, they may be spaced apart on the longitudinal centerline, or on opposite sides thereof or both.

Positioned in vertical alignment with well 12, and removably attached therebeneath, is a wall member 14 provided with a series of outlet bushings 16 in the bottom thereof.

Mounted above the member 14, and extending into the well 12 and in central vertical alignment therewith, is a member 19 of electrical insulating material, such as refractory, shown in section on FIG. 3, having a series of guide openings 20 formed in its periphery which receive and space the electrodes 35 so that their tip portions are arranged in vertical alignment over the orifices of bushing 16 and in contact with the molten glass.

As shown in FIG. 1, the member 19 extends upwardly through the space above the top surface of the glass, in the feeding channel 11.

In order to maintain the implement member 19 in vertical alignment with the well 12, a guide arm 19a is slidable on one vertical shaft 36 and integral with holder 23.

The member 19 is mounted in a holder 23 and supported by a frame 24. This frame 24 is mounted on a vertical shaft 25 which is adapted for vertical adjustment by the hand wheel 26. Shaft 25 is mounted in bearings 27 and 28 formed on the side of the feeder support frame 30. A series of electrodes 35 are disposed in the guide openings 20 of member 19 (FIG. 3), and these electrodes are individually supported on a common support member or frame 34 (FIGS. 1 and 2). The frame 34 is in turn supported on uprights 36 mounted in bearings 33 mounted at the outside of the feeder support frame 30. Each electrode 35 is supported in a bracket 37 attached to the lower end of a vertical shaft 38. The upper end of each shaft extends through a bearing opening 39 in frame 34 and is provided with threads 40 for attachment to hand wheels 41. Rotation of these hand wheels 41 will control the vertical spacing of the lower ends of the electrodes 35 with respect to the bushings 16. This structure permits each electrode 35 to be adjusted individually but in the event it is desirable to adjust them in a group, the uprights 36 are provided with threaded portions 50 and adjustments 51 to permit such adjustment.

Each electrode 35 is provided with an outer coating 35a of an electricity non-conductive material so that electric current is conducted from the exposed lower end tip portions of electrode 35 in contact with the glass.

A vertically disposed rotating sleeve member 55 is provided which may be adjusted and driven by the usual well-known driving means (not shown), much as that disclosed in U.S. Patent to K. E. Peiler, No. 1,735,837.

Figure 5:
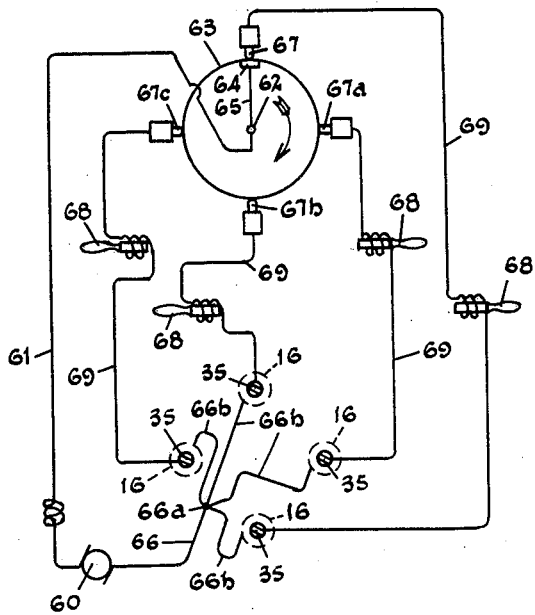
FIG. 5 is an electrical diagram of the electrical circuit for severing the gobs.

Referring in particular to FIGS. 3, 4 and 5, the bushings 16 are illustrated connected as at the negative terminal of an electrical circuit and the electrodes 35 at the positive terminal of this circuit.

Referring particularly to FIG. 5 which is a diagram of one form of an electrical circuit which may be utilized in carrying out this invention.

There is shown for example an A.C. generator 60 which provides power through line 61 to the shaft 62 of a rotating drum 63. Positioned in the outer surface of this drum 63 is an electrical contact on 64 which, in turn, is connected to the shaft 62 by line 65. A series of contact buttons 67, 67a, 67b and 67c are positioned about the circumference of the drum 63. Each of these contact members 67 are connected directly by individual lines 69 to the electrodes 35 and are individual to each electrode. Saturated reactors 68 are introduced to each line 69 of these lines between the contacts 67 and the electrodes 35 to provide a control of the electrical energy in this portion of the circuit. Upon the rotation of drum 63, it should be obvious that contact is established between the contactor 64 and each individual contact button 67, so that each electrode 35 will be successively energized. As here shown, the succession will be in a clockwise direction. Each electrode is positioned directly above a bushing 16 and its corresponding opening 16a, and as the corresponding electrode for each said bushing is energized there will be an electrical impulse generated so that current will flow through the glass between the electrode 35 and its respective bushing 16.

The other side of generator 60 is connected electrically to each orifice bushing 16 to complete the circuit by a lead line 66 jointed at juncture 66a with individual lead lines 66b to each said bushing 16.

Upon the initiation of this electrical impulse, the temperature of the small body of glass in the area between the electrode 35 and the bushing 16 will not only be rapidly brought to an extremely high temperature with its resultant high liquidity, but there should also be an extremely high disturbance or interruption of the flow of glass at this point. In fact, it is found that the interruption and the high liquidity generated provides a severance of a charge of glass from the main body of glass in the well 12.

As the above description is directed to a diagrammatic electrical arrangement, it is believed appropriate at this point to describe a mechanical means which could actually be utilized to perform this electrical function.

Referring to FIGS. 1, 2 and 4, an electrical motor 70 is mounted upon a bracket 71 journaled on the vertical uprights 36. The shaft 72 of the motor 70 extends out from the motor in a horizontal plane and is supported in a bearing bracket 73 mounted upon the frame 71. A series of cams 74 are attached to the motor shaft 72 and may be attached in such a manner as to be adjustable with relation to each other in order that the timing between the electrical impulses to the electrodes 35 may be in any desired time sequence. In addition to this, the motor 70 may be any well known variable speed electric motor to provide any desired number of r.p.m.'s to the cam shaft 72.

Individual to each cam 74 is a bell crank 80 (FIG. 4) mounting a rotatable cam follower 81 on arm 80a and having a bearing element 82 on arm 80b thereof. Electrical contacts 83, corresponding in function to the electrical contactor 64 (described for FIG. 5), are mounted in respective bearing element 82. Bell crank 80 is pivoted about pin 84 in bracket 85 bolted to the frame 71. Also mounted on the frame 71 are brackets 90 carrying electrical contacts 92 which correspond in function to the electrical contacts 67 (described for FIG. 5) and these brackets 90 and contacts 92 are in alignment with the arm 80b and the electrical contacts 83. As the cams 74 rotate they actuate the lever 80 and connect and disconnect with electrical contacts 83 and 92 in proper sequence, as previously described. Thus, when the contact on 83 is in physical contact with the contact 92, energy is transmitted from line 65 to line 69 and thence to the electrode 35 individual thereto. The circuit is completed through the glass, as aforesaid, and bushing 16, line 66b, 66a, 66, and generator 60.

From the preceding it should be apparent that with the predetermined adjustment of the cams 74 on the shaft 72 and with a predetermined r.p.m. of the shaft 72 the desired sequence of energizing the electrodes 35 may be obtained.

The general operation of this device, briefly stated, is as follows:

With the member 19 and electrodes 35 adjusted to a desirable position above and in alignment with the bushing 16 and the openings 16a, motor 70 will be energized to drive the cams 74. These cams will have been adjusted circumferentially on shaft 72 to give a desired sequential pattern for the actuation levers 80 and contained electrical contacts 83. Thus, each individual bell crank 80 will be actuated by its respective cam 74 to energize each electrode 35 and provide energy in the area between the lower end of the electrodes 35 and bushings 16. This electrical energy converted to heat by the resistance presented by the glass will, in turn, raise the temperature of the glass at this area and thus change its viscosity to the point where it is highly liquid and at the same time, will provide a physical disturbance or interruption of the flow of glass to the opening 16a.

This interruption will be of such an extent as to separate the glass in and beyond the bushing 16 from the parent body of molten glass in the well 12. This sequence will be repeated in rapid succession to thereby produce a series of individual mold charges of molten glass from each orifice 16a in succession.

Modifications may be resorted to within the spirit and scope of this disclosure, and the invention is only limited by the scope of the claims.

I claim:

1. In a glass feeding apparatus for forming and feeding mold charges of molten glass contained in a forehearth, the improvement for forming said mold charges at high speed, said improvement comprising a plurality of orifice bushings in the floor of the forehearth, each bushing defining a feeding orifice and each bushing being adapted to conduct electric current to glass undergoing flow therethrough, an electrode individual to each said feeding orifice, means for supporting the electrodes so that they are each aligned vertically with a feeding orifice and in the molten glass, means for electrically insulating each electrode from the molten glass so that only a lowermost tip portion of each aligned electrode is in contact with the glass over its corresponding feeding orifice, a plurality of circuits each including a bushing and its corresponding aligned electrode, a source of electrical current, selective switch means for connecting said source and each of said circuits, and means for operating said switch means in a predetermined order for connecting said circuits individually for a predetermined time duration, each said circuit, when connected, supplying an electric current to the glass undergoing flow through that orifice, to locally heat said glass sufficiently to rapidly separate the flow of glass into successive mold charges.

2. In a glass feeding apparatus for forming and feeding mold charges of molten glass contained in a forehearth, the improvement for forming said mold charges at high speed, said improvement comprising a plurality of spaced orifice bushings arranged in the floor of the forehearth, each bushing defining a feeding orifice and each bushing being adapted to conduct electric current to glass undergoing flow therethrough, an electrode corresponding to each said feeding orifice, means for mounting each of said electrodes on the forehearth including an electrical insulating member constructed to house the electrodes in spaced apart relationship corresponding to the spaced arrangement of said orifices and electrically insulate the major portion of the electrode from the molten glass so that only a lowermost end portion of each electrode is in contact with the molten glass in aligned relationship above their respective orifices, said mounting means also providing for collective and individual adjustment of the elevation of the electrodes with respect to their orifices, a plurality of circuits each including one of said bushings and its corresponding aligned electrode, a source of electrical current, selective switch means for sequentially connecting said source and each of said circuits, and means for operating said switch means in a predetermined order for connecting said circuits individually for a predetermined time duration, each said circuit, when connected, supplying an electric current to the glass undergoing flow through that orifice to subject said glass to sufficient localized heating to rapidly separate the flow of glass into successive mold charges.

3. In a glass feeding apparatus for forming and feeding mold charges of molten glass contained in a forehearth, the improvement for forming said mold charges at high speed, said improvement comprising an orifice bushing in the floor of the forehearth defining a feeding orifice and constructed of electrical conducting material, an electrode associated with said feeding orifice, an electrical insulating member surrounding a portion of said electrode and arranged to permit only a lower end of the electrode to contact the molten glass, a frame, means including an adjustable connection between the electrode and said frame for supporting the electrode in a spaced operating position overlying said orifice, said adjustable connection providing for adjustment of the elevation of the electrode with respect to said orifice, an electrical circuit through the molten glass including said bushing and said associated electrode, a source of electrical current connected in said circuit, switch means in said circuit for sequentially opening and closing said circuit, and means for operating said switch means for closing said circuit for a predetermined time interval, said circuit, when closed, impressing an electric current through the glass undergoing flow through that orifice to locally heat said glass sufficiently, whereby the flow of glass through the orifice is rapidly separated into successive mold charges.

References Cited in the file of this patent

UNITED STATES PATENTS

| | | |
|---|---|---|
| 1,375,336 | Wadsworth | Apr. 19, 1921 |
| 1,853,842 | Bates et al. | Apr. 12, 1932 |
| 1,961,894 | Wadman et al. | June 5, 1934 |
| 2,101,675 | Ferguson | Dec. 7, 1937 |
| 2,142,006 | Schaffer et al. | Dec. 27, 1938 |
| 2,162,800 | Crimmel | June 20, 1939 |
| 2,215,982 | Slayter et al. | Sept. 24, 1940 |
| 2,708,553 | Dyer | May 17, 1955 |
| 2,913,509 | Pinotti | Nov. 17, 1959 |

FOREIGN PATENTS

| | | |
|---|---|---|
| 776,430 | Great Britain | June 5, 1957 |